United States Patent
Sonoda et al.

(10) Patent No.: US 10,196,302 B2
(45) Date of Patent: Feb. 5, 2019

(54) METHOD FOR MANUFACTURING ANTIREFLECTION FUNCTION-EQUIPPED LENS

(71) Applicant: FUJIFILM Corporation, Tokyo (JP)

(72) Inventors: Shinichiro Sonoda, Ashigarakami-gun (JP); Tatsuya Yoshihiro, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 15/269,275

(22) Filed: Sep. 19, 2016

(65) Prior Publication Data

US 2017/0001905 A1    Jan. 5, 2017

Related U.S. Application Data

(63) Continuation of application No. PCT/JP2015/001253, filed on Mar. 9, 2015.

(30) Foreign Application Priority Data

Mar. 24, 2014  (JP) .................................. 2014-059543

(51) Int. Cl.
*C03C 17/34*    (2006.01)
*B32B 9/00*    (2006.01)
(Continued)

(52) U.S. Cl.
CPC .......... *C03C 17/3411* (2013.01); *B32B 5/147* (2013.01); *B32B 9/00* (2013.01);
(Continued)

(58) Field of Classification Search
CPC ......... C03C 17/3452; B05D 1/18; B05C 3/09; B05C 3/18
See application file for complete search history.

(56) References Cited

U.S. PATENT DOCUMENTS 6,528,117 B2 *  3/2003  Lewis ....................... B05C 9/02
                                                    427/256
2002/0122962 A1 *  9/2002  Arfsten ................. C03C 17/007
                                                    428/697

(Continued)

FOREIGN PATENT DOCUMENTS

JP    2005-275372 A    10/2005
JP    2010-54827 A    3/2010
(Continued)

OTHER PUBLICATIONS

Machine Translation of JP 2010066681 A, no date.*

(Continued)

*Primary Examiner* — Alex A Rolland
(74) *Attorney, Agent, or Firm* — Birch, Stewart, Kolasch & Birch, LLP

(57) ABSTRACT

A dielectric multilayer film is formed on one surface of a lens main body, a film including aluminum is formed on the other surface of the lens main body, the film including aluminum is immersed in hot water without immersing the dielectric multilayer film in the hot water, thereby changing the film including aluminum to a fine uneven structure film including an alumina hydrate as a main component, whereby a lens provided with antireflection functions on both surfaces is manufactured.

8 Claims, 3 Drawing Sheets

(51) Int. Cl.
*G02B 1/115* (2015.01)
*G02B 1/118* (2015.01)
*B32B 5/14* (2006.01)
*B32B 15/20* (2006.01)
*C03C 17/245* (2006.01)

(52) U.S. Cl.
CPC ............ *B32B 15/20* (2013.01); *C03C 17/245* (2013.01); *C03C 17/3452* (2013.01); *G02B 1/115* (2013.01); *G02B 1/118* (2013.01); *B32B 2551/00* (2013.01); *C03C 2217/214* (2013.01); *C03C 2217/22* (2013.01); *C03C 2217/734* (2013.01); *C03C 2218/154* (2013.01)

(56) References Cited

U.S. PATENT DOCUMENTS

| | | |
|---|---|---|
| 2005/0233113 A1 | 10/2005 | Kotani et al. |
| 2010/0296177 A1 | 11/2010 | Okuno |
| 2011/0129659 A1 | 6/2011 | Teranishi et al. |
| 2011/0176216 A1 | 7/2011 | Kawauchi et al. |
| 2014/0016204 A1 | 1/2014 | Hakuta et al. |

FOREIGN PATENT DOCUMENTS

| | | | |
|---|---|---|---|
| JP | 2010-66681 A | | 3/2010 |
| JP | 2010066681 A | * | 3/2010 |
| JP | 2010-269957 A | | 12/2010 |
| JP | 2010-271533 A | | 12/2010 |
| JP | 2011-17782 A | | 1/2011 |
| JP | 2011-118043 A | | 6/2011 |
| JP | 2011-145627 A | | 7/2011 |
| JP | 2012-198330 A | | 10/2012 |

OTHER PUBLICATIONS

Chinese Office Action and Search Report, dated Mar. 7, 2017, for corresponding Chinese Application No. 201580014837.4, with an English machine translation of the Chinese Office Action.
Japanese Office Action, dated Mar. 7, 2017, for corresponding Japanese Application No. 2014-059543, with an English machine translation.
Chinese Office Action, dated Sep. 13, 2017, for corresponding Chinese Application No. 201580014837.4, with an English machine translation.
Written Opinion of the International Searching Authority for PCT/JP2015/001253 (PCT/ISA/237) dated May 26, 2015.
International Search Report for PCT/JP2015/001253 (PCT/ISA/210) dated May 26, 2015.

* cited by examiner

METHOD FOR MANUFACTURING ANTIREFLECTION FUNCTION-EQUIPPED LENS

CROSS-REFERENCE TO RELATED APPLICATIONS

This application is a Continuation of PCT International Application No. PCT/JP2015/001253 filed on Mar. 9, 2015, which claims priority under 35 U.S.C. § 119(a) to Japanese Patent Application No. 2014-059543 filed on Mar. 24, 2014. Each of the above applications is hereby expressly incorporated by reference, in its entirety, into the present application.

BACKGROUND OF THE INVENTION

1. Field of the Invention

The present invention relates to a method for manufacturing an antireflection function-equipped lens and particularly to a method for manufacturing an antireflection function-equipped lens having one surface provided with a non-reflective coating consisting of a dielectric multilayer film and the other surface provided with a structured non-reflective coating.

2. Description of the Related Art

In the related art, in optical elements (lenses) in which translucent media such as glass media and plastic media are used, when surface reflection frequently occurs, flares or ghosts are frequently generated, and the transmittance decreases, and thus antireflection films made of thin dielectric films are provided on the surfaces. These antireflection films are required to be capable of producing favorable antireflection effects even when the incidence angle ranges of the fluxes of light incident on optical elements are wide. In order to obtain strong antireflection effects in wide incidence angle ranges, it is required that the difference in refractive index between films constituting interfaces between the air and a layer or between a layer and a layer is small. As methods for realizing small differences in refractive index, structured non-refractive coating in which antireflection functions are imparted by forming fine unevenness that is equal to or smaller than the wavelengths of visible light on surfaces is known (JP2005-275372A and the like).

Meanwhile, antireflection films having uneven structures have broad spectra and are capable of suppressing reflectance at low levels with respect to light rays at low to high angles, but have a problem of weak wear resistance due to their uneven shapes.

JP2010-269957A discloses a lens having a dielectric multilayer film formed on one surface and an uneven structure film formed on the other surface using boehmite. In Example 2 in JP2010-269957A, a manufacturing method in which a dielectric film is formed on one surface of a lens, and then an alumina film is formed on the other surface and is then immersed in hot water, thereby forming a fine uneven structure film is employed.

JP2011-145627A discloses a method in which, in a state in which one surface remains non-coated (non-treated), an alumina film is formed on the other surface, and then a hot water treatment is carried out, thereby forming a fine uneven structure film. Although there is no description of any treatments after the formation of the fine uneven structure film in JP2011-145627A, when a dielectric multilayer film is formed on one surface after the formation of the fine uneven structure film, it is possible to obtain lenses having an antireflection film consisting of a dielectric multilayer film on one surface and an antireflection film consisting of a fine uneven structure film on the other surface.

SUMMARY OF THE INVENTION

As a result of studies, the present inventors clarified that, when a hot water treatment is carried out after the formation of a dielectric multilayer film on one surface and an aluminum film on the other surface as in JP2010-269957A, there is a problem of spectroscopic characteristics changing depending on the dielectric multilayer film.

When a fine uneven structure film is formed first on the other surface by carrying out a hot water treatment, and then a dielectric multilayer film is formed on one surface as in JP2011-145627A, the above-described problem is not caused. However, since the fine uneven structure film is easily breakable, there is a high possibility that, during the film formation treatment steps of dielectric multilayer films, when tools, human hands, and the like come into contact with the fine uneven structure film, peeling, defects, and the like may be caused in the uneven structure film, and thus the spectroscopic characteristics partially deteriorate, and the uneven structure film becomes inferior products, and consequently, the manufacturing yield decreases.

The invention of the present application has been made in consideration of the above-described circumstances, and an object of the present invention is to provide a manufacturing method for manufacturing an antireflection function-equipped lens including a dielectric multilayer film on one surface and a non-reflective coating consisting of a fine uneven structure film on the other surface at a high yield.

A method for manufacturing an antireflection function-equipped lens of the present invention is a method for manufacturing an antireflection function-equipped lens comprising: forming a dielectric multilayer film on one surface of a lens main body, forming a film including aluminum on the other surface of the lens main body, and immersing only the surface on which the film including aluminum is formed in hot water to change the film including aluminum to a fine uneven structure film including an alumina hydrate as a main component.

The cycle (average pitch) of unevenness of the fine uneven structure film is set to be sufficiently smaller than wavelengths of light being used.

An outermost surface of the dielectric multilayer film can be a layer consisting of $MgF_2$.

An immersion duration in hot water can be set to one minute or longer.

According to the method for manufacturing an antireflection function-equipped lens of the present invention, since an antireflection film consisting of the dielectric multilayer film is formed on one surface of the lens main body, and then an antireflection film consisting of the fine uneven structure film is formed on the other surface, handling properties are favorable, risks of defects being generated in the fine uneven structure film are reduced, and antireflection function-equipped lenses can be manufactured at a high yield.

In addition, since, during the formation of the fine uneven structure film, the previously-formed dielectric multilayer film is not immersed in hot water, and only the surface on which the film including aluminum is formed is immersed in hot water, the dielectric multilayer film is not affected by the hot water treatment, and it is possible to maintain favorable antireflection performance without changing spectroscopic characteristics even in the hot water treatment step.

DESCRIPTION OF THE PREFERRED EMBODIMENTS

Hereinafter, an embodiment of the present invention will be described with reference to the accompanying drawings.

Figure 1:
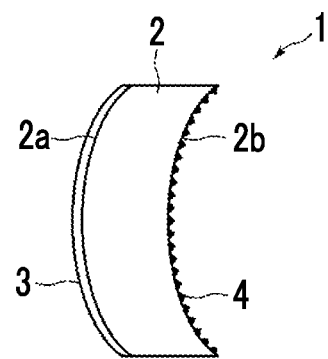
FIG. 1 is a schematic sectional view illustrating a lens manufactured using a manufacturing method of an embodiment of the present invention.

FIG. 1 is a schematic sectional view of an antireflection function-equipped lens 1 manufactured using a method for manufacturing an antireflection function-equipped lens according to an embodiment of the present invention.

As illustrated in FIG. 1, the antireflection function-equipped lens 1 is constituted of a lens main body 2, an antireflection film consisting of a dielectric multilayer film 3 provided on one surface 2a thereof, and an antireflection film consisting of a fine uneven structure film 4 provided on the other surface 2b.

A method for manufacturing an antireflection function-equipped lens is a method for manufacturing an antireflection function-equipped lens including antireflection films on both surfaces 2a and 2b by preparing the lens main body 2, forming the dielectric multilayer film 3 on the surface 2a of the lens main body 2, forming a film including aluminum on the other surface 2b, and then immersing only the surface 2b on which the film including aluminum is formed in hot water (boiling water), thereby changing the film including aluminum to a fine uneven structure film including an alumina hydrate as a main component.

Examples of the film including aluminum include aluminum films, alumina films, and the like, and any films may be used as long as the films turn into boehmite by means of hot water treatments and thus change to fine uneven structure films including an alumina hydrate as a main component.

The surface 2b is immersed in hot water while holding the lens main body 2 so as to prevent the dielectric multilayer film 3 formed on the surface 2a from being immersed in water. The immersion duration in hot water is preferably set to one minute or longer.

Figure 2:
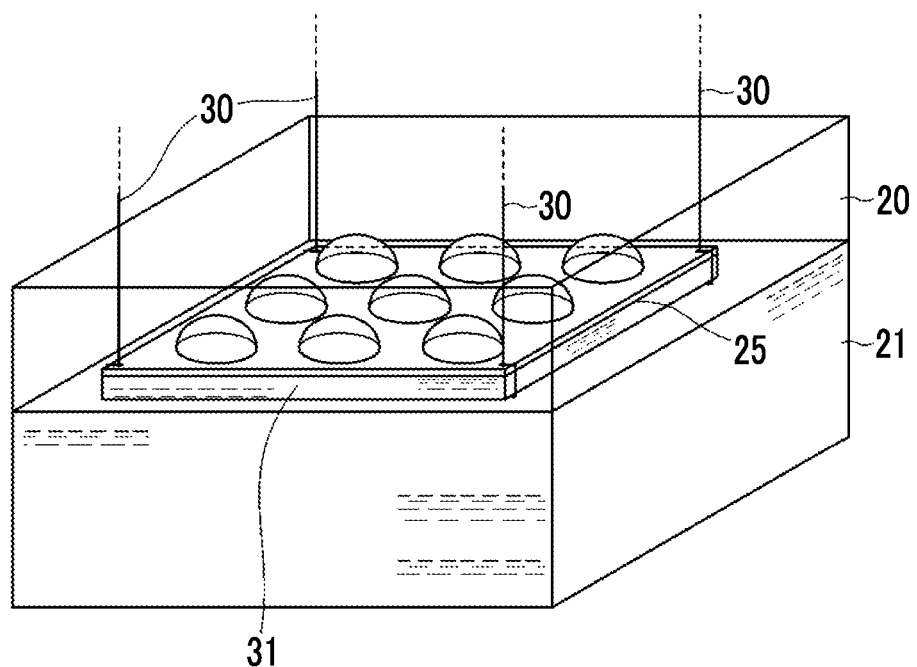
FIG. 2 is a perspective view describing the manufacturing method of the embodiment of the present invention.
Figure 3:
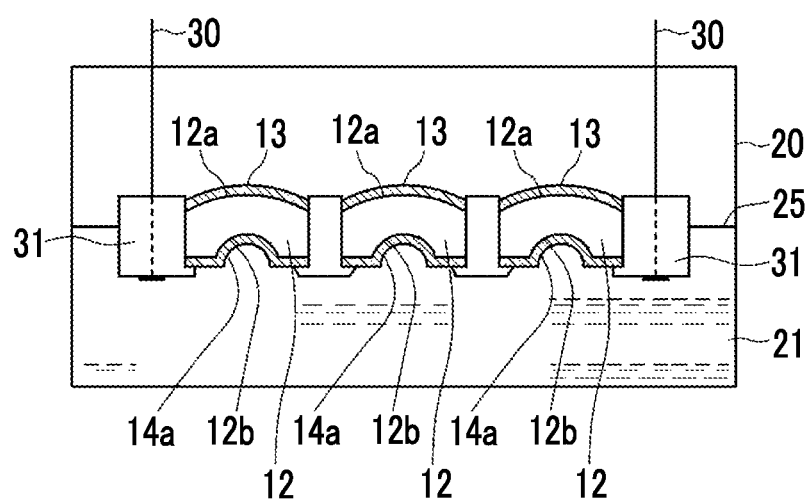
FIG. 3 is a view illustrating a section of FIG. 2.

FIG. 2 is a perspective view for describing the holding state of the lens main body during the hot water treatment, and FIG. 3 is a sectional view for describing liquid surfaces and the immersion region of the lens. FIGS. 2 and 3 illustrate an example in which the hot water treatment is carried out on not a single lens but a plurality of lenses at the same time, but the description is also identical to hot water treatments carried out on a single lens. Lenses 12 having a dielectric multilayer film 13 formed on one surface 12a and a film 14a including aluminum formed on the other surface 12b are set in a lens holder 31 capable of holding a plurality of the lenses 12 at the same time so that the surfaces on which the film 14a including aluminum face the liquid surface side (the lower surface) as illustrated in FIGS. 2 and 3. As illustrated in FIG. 2, the lens holder 31 is horizontally held using a hanging tool 30 at the four corners so as to form a state in which only the single surfaces 12b of the lenses 12 are in contact with the liquid surface. When the lenses are held for a certain period of time in hot water (in boiling water) in this state, the films 14a including aluminum change to transparent fine uneven structure films including an alumina hydrate as a main component.

The hanging tool 30 illustrated in FIG. 2 is constituted of four strings and is constituted to fix the lens holder 31 by tying the strings through holes provided at the four corners of the lens holder 31 and horizontally hold the lens holder by adjusting the lengths of the four strings. The constitution of lens holding tools during the hot water treatment which consist of the lens holder 31 and the hanging tool 30 in the present embodiment is not particularly limited as long as lenses can be held so that only single surfaces thereof are immersed in water during the hot water treatment, and, for example, constitutions in which lenses are held by pinching the end portions of lens main bodies may be employed.

The hydrate of alumina is boehmite (denoted as $Al_2O_3 \cdot H_2O$ or AlOOH) which is an alumina monohydrate, bayerite (denoted as $Al_2O_3 \cdot 3H_2O$ or $Al(OH)_3$) which is alumina trihydrate (aluminum hydroxide), or the like.

The cycle (average pitch) of the unevenness of the fine uneven structure film 4 is set to be sufficiently smaller than the wavelengths of light being used (for example, visible light or infrared light). Specifically, the cycle of the fine unevenness is in an order of several tens of nanometers to several hundreds of nanometers. In the fine uneven structure film 4, the pitch refers to the distance between the top points of convex portions that are most adjacent to each other with a concave portion therebetween, and the depth refers to the distance from the top point of a convex portion to a bottom portion of an adjacent concave portion.

The fine uneven structure film has a structure in which the fine uneven structure film becomes more loose as being further away from base materials (the widths of voids corresponding to concave portions become large, and the widths of convex portions become small), and the refractive index becomes small as the fine uneven structure film is further away from base materials.

The average pitch of the unevenness can be obtained by, for example, capturing images of the surfaces of the fine uneven structure using scanning electron microscopes (SEMs), binarizing the images by means of image processing, and carrying out statistical treatments. Similarly, the film thicknesses of the uneven structure film can be obtained by capturing images of the sections of the fine uneven structure film and processing the images.

The dielectric multilayer film 3 formed on the surface 2a is generally constituted by alternately laminating layers of low refractive indexes and layers of high refractive indexes. As the layers of low refractive indexes, $MgF_2$, $SiO_2$, and $Al_2O_3$ can be used, and, as the layers of high refractive indexes, $TiO_2$, $ZrO_2$, $Ta_2O_5$, $Nb_2O_5$, and the like can be used. Particularly, it is preferable to form a layer consisting of $MgF_2$ as the outermost surface of the dielectric multilayer film 3.

According to the manufacturing method of the present invention, since the hot water treatment for forming the fine uneven structure film is carried out without immersing the dielectric multilayer film 3 in water, it is possible to maintain favorable antireflection performance of the dielectric multilayer film 3 without changing the spectroscopic characteristics of the dielectric multilayer film 3.

According to studies by the present inventors, layers consisting of MgF$_2$ have weak water resistance and have spectroscopic characteristics that extremely significantly change when the layers are subjected to the hot water treatments. Particularly, when the hot water treatment duration is set to one minute or longer, the change is significant. Therefore, in a case in which a dielectric multilayer film having a layer consisting of MgF$_2$ as the outermost surface is provided, the manufacturing method of the present invention exhibit significant effects.

In addition, since the fine uneven structure film is formed after the formation of the dielectric multilayer film, handling properties are favorable, risks of defects being generated in the fine uneven structure film are reduced, and antireflection function-equipped lenses can be manufactured at a high yield.

EXAMPLES

Hereinafter, methods for manufacturing an antireflection function-equipped lens of examples and comparative examples of the present invention will be described.

Examples

A method for manufacturing antireflection function-equipped lenses of the examples was carried out according to the following order.

First, a lens material (BK7) was polished or molded so as to form a lens main body 2, and an antireflection film consisting of a dielectric multilayer film was formed on one surface 2a of the lens main body 2. Here, an 81 nm-thick Al$_2$O$_3$ film, a 131 nm-thick ZrO$_2$ film, and a 98 nm-thick MgF$_2$ film were formed on the lens surface 2a in this order using a vapor deposition method.

After that, a 80 nm-thick Al$_2$O$_3$ film was formed on the other surface 2b of the lens main body 2 using a sputtering method.

Next, a holder in which the lens was set was placed above the liquid surface of a hot-water bath so that only the other surface 2b of the lens main body 2 came into contact with hot water and was fixed near the liquid surface, thereby immersing only the lens surface 2b in hot water. After being immersed in boiling water for certain periods of time (0.5 minutes in Example 1, one minute in Example 2, two minutes in Example 3, three minutes in Example 4, four minutes in Example 5, and five minutes in Example 6), the lens was lifted, cooled, then, immersed in isopropyl alcohol (IPA), and was dried. Due to this treatment, in each of Examples 1 to 6, the Al$_2$O$_3$ film formed on the other surface 2b turned into boehmite and changed to a fine uneven structure film.

By means of the above-described steps, antireflection function-equipped lenses having antireflection films respectively formed on both surfaces 2a and 2b of the lens main body 2 were obtained.

For the lenses of Examples 1 to 6 that had been treated for the different hot water treatment durations, the antireflection functions of the dielectric multilayer films were measured. As the measurement of the antireflection functions, the spectroscopic spectra were measured using a reflection spectroscopic determination device (FE3000 manufactured by Otsuka Electronics Co., Ltd.).

Figure 4:
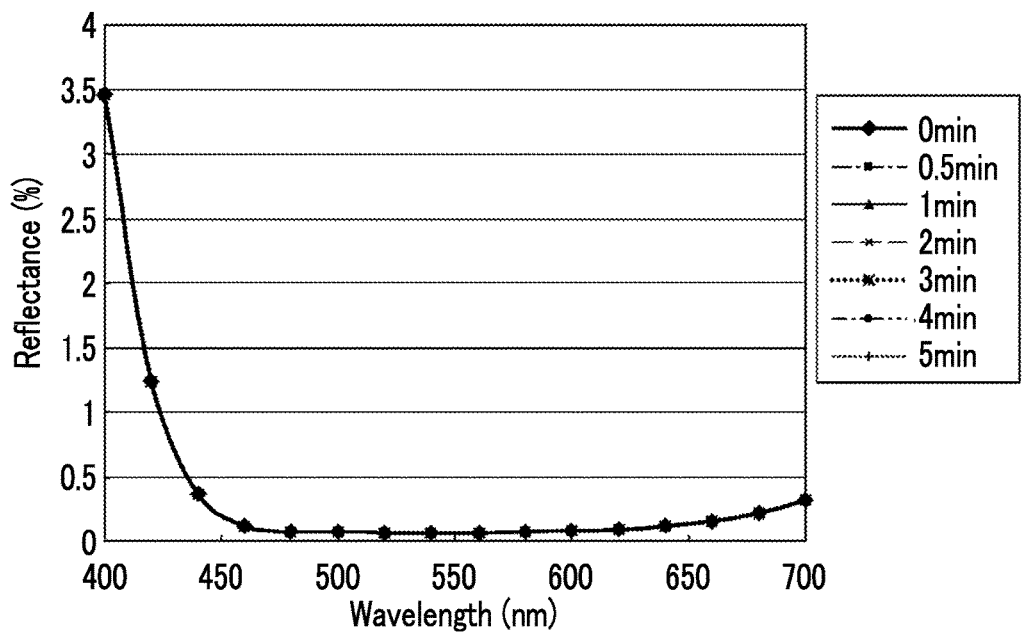
FIG. 4 is a view illustrating the wavelength dependency of reflectance of dielectric multilayer films in lenses manufactured by hot water treatments for different treatment durations in manufacturing methods of examples.

FIG. 4 illustrates the results of the measurement and is a graph illustrating the wavelength dependency of reflectance in the respective examples. Regardless of the durations of the hot water treatment, results illustrating the same wavelength dependency of reflectance of the dielectric multilayer films in the lenses of all the examples were obtained. It is considered that, since the dielectric multilayer films were not immersed in hot water, the characteristics did not change.

Comparative Examples

A method for manufacturing antireflection function-equipped lenses of the comparative examples was carried out according to the following order.

First, a lens material (BK7) was polished or molded so as to form a lens main body 2, and an antireflection film consisting of a dielectric multilayer film was formed on one surface 2a of the lens main body 2. Here, an 81 nm-thick Al$_2$O$_3$ film, a 131 nm-thick ZrO$_2$ film, and a 98 nm-thick MgF$_2$ film were formed on the lens surface 2a in this order using a vapor deposition method.

After that, a 80 nm-thick Al$_2$O$_3$ film was formed on the other surface 2b of the lens main body 2 using a sputtering method. Next, the entire lens was immersed in a hot-water bath so that the entire lens came into contact with hot water as disclosed by JP2010-269957A described above. After being immersed in boiling water for certain periods of time (0.5 minutes in Comparative Example 1, one minute in Comparative Example 2, two minutes in Comparative Example 3, three minutes in Comparative Example 4, four minutes in Comparative Example 5, and five minutes in Comparative Example 6), the lens was lifted, cooled, then, immersed in isopropyl alcohol (IPA), and was dried. Due to this treatment, in each of Examples 1 to 6, the Al$_2$O$_3$ film formed on the other surface 2b turned into boehmite and changed to a fine uneven structure film.

By means of the above-described steps, antireflection function-equipped lenses having antireflection films respectively formed on both surfaces 2a and 2b of the lens main body 2 were obtained.

Similar to the examples, for the lenses of Comparative Examples 1 to 6 that had been treated for the different hot water treatment durations, the antireflection functions of the dielectric multilayer films were measured.

Figure 5:
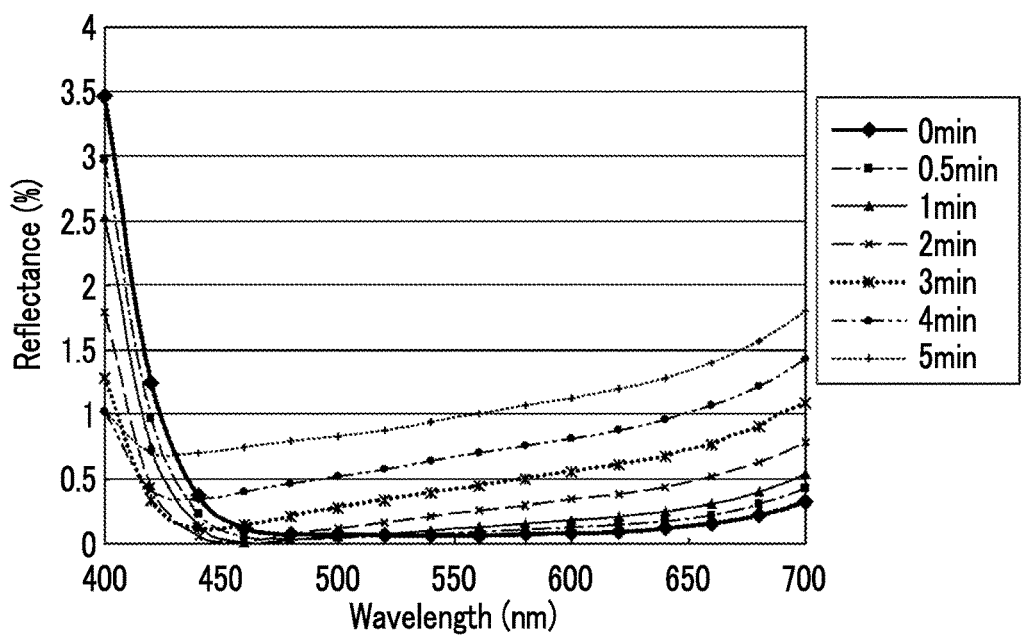
FIG. 5 is a view illustrating the wavelength dependency of reflectance of dielectric multilayer films in lenses manufactured by hot water treatments for different treatment durations in manufacturing methods of comparative examples.

FIG. 5 illustrates the results of the measurement and is a graph illustrating the wavelength dependency of reflectance in the respective examples. Before and after the hot water treatment process, the wavelength dependency of reflectance of the dielectric multilayer film in the lens significantly changed, and the reflectance significantly increased after the hot water treatment. Particularly, results in which the increase rates of the reflectance were great when the treatment durations were one minute or longer and, as the treatment durations extended, the reflectance after the treatments became great were obtained. This is a result illustrating that, when the hot water treatment is also carried out on the dielectric multilayer film at the same time, the reflection characteristics of the dielectric multilayer film change.

What is claimed is:
1. A method for manufacturing a lens, comprising:
   forming a dielectric multilayer film on one surface of a lens main body;
   forming a film including aluminum on the other surface of the lens main body; and
   immersing the film including aluminum in hot water without immersing the dielectric multilayer film in the hot water to change the film including aluminum to a fine uneven structure film including an alumina hydrate as a main component, wherein the lens main body is set in a lens holder capable of holding the lens main body so that the other surface faces a liquid surface of the hot water, and only the other surface is immersed in the hot water;

wherein the lens holder is horizontally held using a hanging tool at four corners of the lens holder so as to form a state in which only the other surface is immersed in the hot water; and wherein the hanging tool is constituted of four strings and is constituted to fix the lens holder by tying the strings at the four corners of the lens holder.

2. The method for manufacturing a lens according to claim 1, wherein an average pitch of the unevenness of the fine uneven structure film is in an order of several tens of nanometers to several hundreds of nanometers.

3. The method for manufacturing a lens according to claim 1, wherein an outermost surface of the dielectric multilayer film is $MgF_2$.

4. The method for manufacturing a lens according to claim 3, wherein an average pitch of the unevenness of the fine uneven structure film is in an order of several tens of nanometers to several hundreds of nanometers.

5. The method for manufacturing a lens according to claim 1, wherein an immersion duration in the hot water is from one minute to 5 minutes.

6. The method for manufacturing a lens according to claim 5, wherein an average pitch of the unevenness of the fine uneven structure film is in an order of several tens of nanometers to several hundreds of nanometers.

7. The method for manufacturing a lens according to claim 3, wherein an immersion duration in the hot water is from one minute to 5 minutes.

8. The method for manufacturing a lens according to claim 7, wherein an average pitch of the unevenness of the fine uneven structure film is in an order of several tens of nanometers to several hundreds of nanometers.

* * * * *